(12) United States Patent
Fifield

(10) Patent No.: US 6,178,512 B1
(45) Date of Patent: Jan. 23, 2001

(54) WIRELESS NETWORK

(75) Inventor: Robert Fifield, Redhill (GB)

(73) Assignee: U.S. Philips Corporation, New York, NY (US)

( * ) Notice: Under 35 U.S.C. 154(b), the term of this patent shall be extended for 0 days.

(21) Appl. No.: 09/135,860

(22) Filed: Aug. 18, 1998

(30) Foreign Application Priority Data

Aug. 23, 1997 (GB) .................................................. 9717868

(51) Int. Cl.[7] .................................................... G06F 1/24
(52) U.S. Cl. ...................... 713/201; 713/150; 713/160; 380/247; 380/270
(58) Field of Search .................... 713/201, 150, 713/160, 161, 164, 168; 388/247, 270

(56) References Cited

U.S. PATENT DOCUMENTS 5,243,653  9/1993  Malek et al. ............................ 380/48
5,274,841  12/1993  Natarajan et al. ................... 455/33.4

FOREIGN PATENT DOCUMENTS

0748073A1  12/1996  (EP) .
2069799  8/1981  (GB) .

OTHER PUBLICATIONS

PHB 34,177, U.S. application No. 09/102,838, filed: Jun. 23, 1998.

Primary Examiner—Thomas R. Peeso
(74) Attorney, Agent, or Firm—Daniel J. Piotrowski

(57) ABSTRACT

A method of operating a wireless network comprising a plurality of public wireless terminals and private wireless terminals, and optionally a base station uses a transmission frame including a control section which may schedule encrypted communication between private wireless terminals and unencrypted communication between public wireless terminals and between public and private wireless terminals. Wireless terminals may join the network as private or public terminals.

10 Claims, 3 Drawing Sheets

WIRELESS NETWORK

BACKGROUND OF THE INVENTION

The present invention relates to private wireless networks for communication between a number of wireless terminals, both public and private, which are free to join and leave the network at any time. The network may be configured so that all the wireless terminals communicate through a base station, or so that the devices communicate directly with one another.

Wireless networks are intended to offer flexible and cost-effective alternatives to wired networks, for example as Local Area Networks (LANs). An advantage of wireless over fixed networks is the ease with which new networks can be created and with which new devices, known as wireless terminals, can be added to the network. Some wireless network standards exist, for example IEEE 802.11 in the USA and HIPERLAN in Europe, whilst others are under development, for example Wireless Asynchronous Transfer Mode (WATM). Such standards define the format of a transmission frame, within which control and data transfer functions can take place. The format and length of transmission frames may be fixed or dynamically variable.

Known wireless networks, for instance as disclosed in U.S. Pat. No. 5,274,841, typically operate in one of two different configurations:

1. A base station orientated configuration in which wireless terminals can only communicate with each other with the support of a base station, which is responsible for all wireless terminals within a certain radio coverage area. The base station itself may be connected to further wired networks for communications beyond the radio coverage area. The base station may be a separate unit, or it may be a wireless terminal with additional functionality.

2. A peer to peer configuration in which wireless terminals communicate directly with one another. One of the wireless terminals is typically chosen dynamically to perform the control function.

The first configuration is generally considered to be most suitable for networks with a relatively fixed structure, while the second is considered most suitable for the generation of dynamic networks, such as for document exchange at a meeting.

In order for a wireless network to realise the advantage of flexibility, the procedure for wireless terminals joining and leaving the network should be as simple as possible. The act of a wireless terminal joining a network is known as association and needs to be scheduled within the data transmission format defined for the wireless network. Examples of known techniques for association include dynamic framelength slotted ALOHA, described in GB-B-2 069 799, carrier sense multiple access and address based tree resolution algorithms.

A problem with known wireless networks is that security can be compromised if the network is open to any wireless terminal, but flexibility is sacrificed if access is limited to a known set of wireless terminals.

SUMMARY OF THE INVENTION

An object of the present invention is to enable the use of a wireless network comprising both public and private users, maintaining a high degree of security in communications between private users.

According to a first aspect of the present invention there is provided a method of operating a wireless network, wherein transmission of data takes place in transmission frames subdivided into time slots, the wireless network comprising a controller and a variable number of public and private wireless terminals, the method comprising the controller maintaining a list of wireless terminals currently registered with the network, determining the lengths of successive transmission frames and allocating time slots within said frames for various purposes, each frame including a control section which details the allocation of time slots in the remainder of the transmission frame, characterised by a part of the control section being unencrypted, to allocate time slots in an unencrypted part of the transmission frame for unencrypted data exchange, and another part of the control section being encrypted, to allocate time slots in an encrypted part of the transmission frame for encrypted data exchange.

According to a second aspect of the present invention there is provided a controller for a wireless network having a plurality of public and private wireless terminals, the controller comprising means for maintaining a list of wireless terminals currently registered with the network, means for encryption, means for determining the lengths of successive transmission frames and means for allocating time slots within each of said frames for various purposes, each frame including a control section which details the allocation of time slots in the remainder of the transmission frame, characterised by means for generating a part of the control section in an unencrypted form, for allocating time slots in an unencrypted part of the transmission frame for unencrypted data exchange, and another part of the control section in encrypted form, for allocating time slots in an encrypted part of the transmission frame for encrypted data exchange.

According to a third aspect of the present invention there is provided a wireless terminal for use in a wireless network constituted by at least one wireless terminal and a controller which in operation generates transmission frames, each transmission frame including a control section, the wireless terminal comprising transceiver means and means for storing encryption data, characterised by means for obtaining encryption control data from the control section of a received transmission frame, means for determining which fields within a transmission frame are encrypted, means for decrypting received data transmitted in an encrypted part of a transmission frame and means for encrypting data to be transmitted in an encrypted part of a transmission frame.

The present invention is based upon the recognition, not present in the prior art, that having separate encrypted and unencrypted fields within a transmission frame format enables a private network to allow access by public wireless terminals without compromising security.

By means of the present invention a wireless network can comprise both public and private wireless terminals, with communication between private wireless terminals remaining secure.

BRIEF DESCRIPTION OF THE DRAWINGS

The present invention will now be described, by way of example, with reference to the accompanying drawings, wherein.

In the drawings the same reference numerals have been used to indicate corresponding features.

DETAILED DESCRIPTION OF THE PREFERRED EMBODIMENTS

Figure 1:
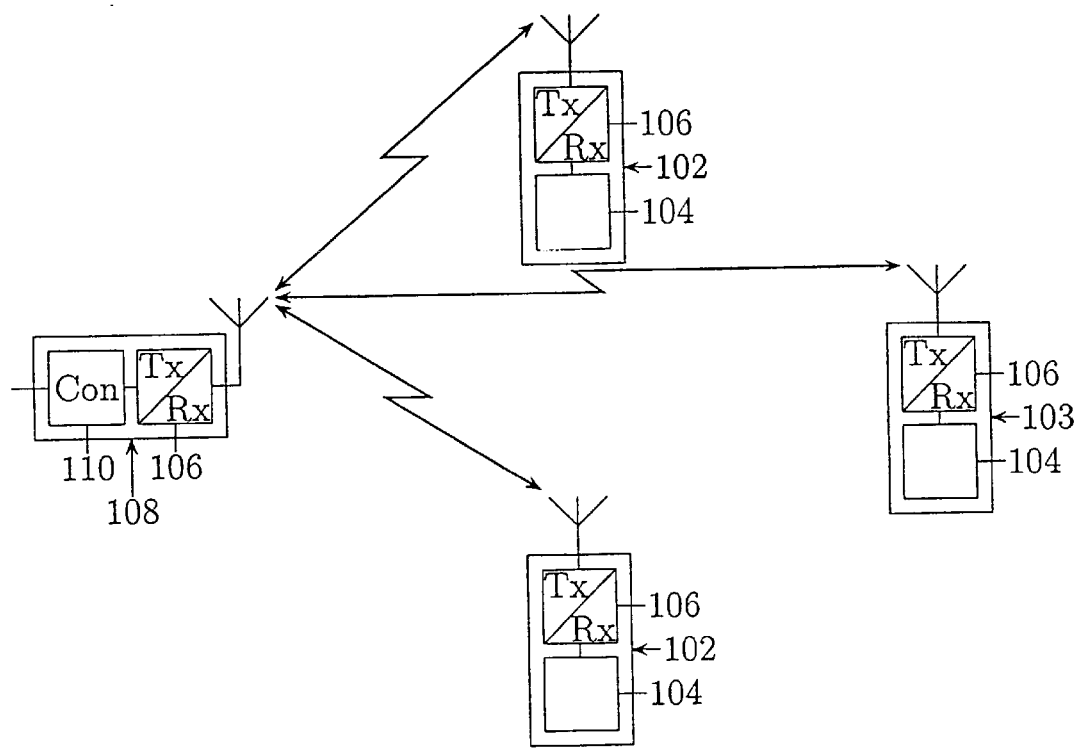
FIG. 1 is a block schematic diagram of a wireless network made in accordance with the present invention, having a base station orientated configuration.

The base station orientated wireless network shown in FIG. 1 comprises a number of private wireless terminals 102, a public wireless terminal 103 and a base station 108, which base station is optionally connected to a fixed telecommunications network, for example the PSTN. The wireless terminals 102, 103 comprise transceivers 106 which communicate with one another via the base station 108 which comprises a transceiver 106 and a controller 110. The controller 110 may be at the same location as the transceiver 106 or remote from it and connected by land line connection means. A variety of devices may be configured to act as wireless terminals 102, for example portable computers, printers and measurement equipment. In addition to the transceiver 106 each wireless terminal also comprises an application-specific block 104 which implements the required functionality.

The private wireless terminals 102 are programmed, by the administrator of the private network, with a number of encryption keys which, once set, are inaccessible to the user. All private wireless terminals 102 for use on a particular network are programmed with the same set of keys. In order to encrypt some data a key has to be selected from the set, for example key 4, and a seed has to be specified, for example 1A78. With the common set of keys, all the private wireless terminals 102 will be able to decrypt information intended for them, as well as being able to access all unencrypted network traffic. The public wireless terminal 103 does not have access to the keys for the private network, and is therefore unable to gain access to data transmitted to and from the private wireless terminals 102.

Figure 2:
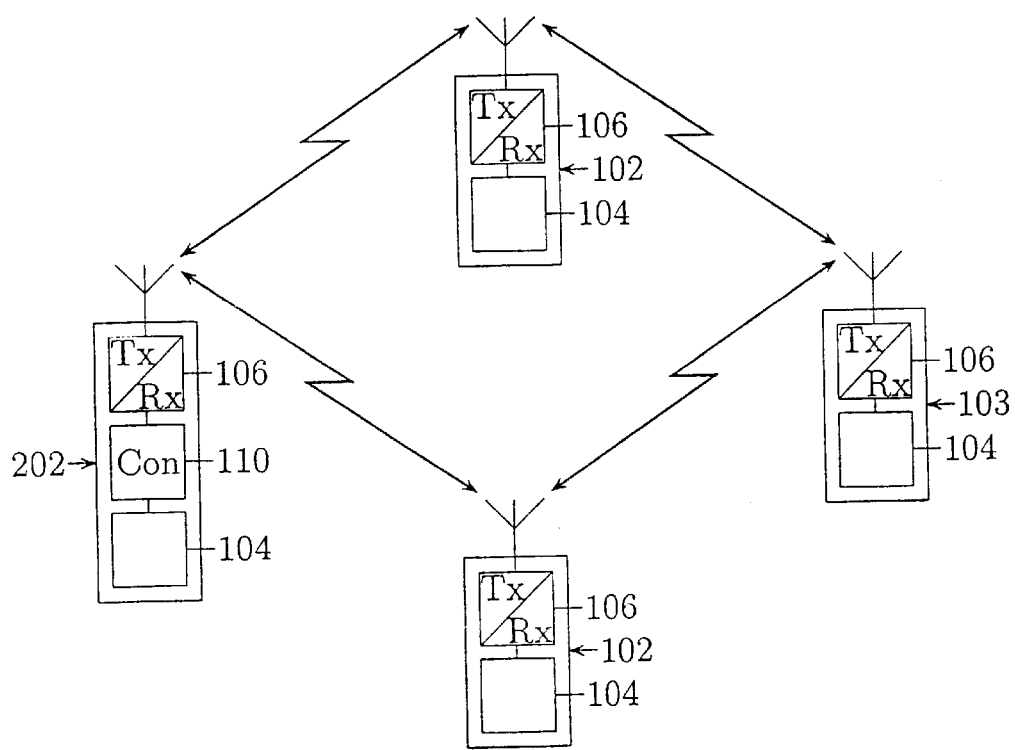
FIG. 2 is a block schematic diagram of a wireless network made in accordance with the present invention, having a peer to peer configuration.

The peer to peer wireless network shown in FIG. 2 comprises a number of private wireless terminals 102, a public wireless terminal 103 and a private enhanced wireless terminal 202, which comprises a transceiver 106 and application-specific block 104, as for a standard wireless terminal, and further comprises a controller 110 to enable it to perform the control function in a wireless network if required. The wireless terminals 102, 103 and private enhanced wireless terminal 202 communicate directly with one another rather than via a base station. If there is only one private enhanced wireless terminal 202 it performs the control function for the network, otherwise one of the private enhanced wireless terminals 202 is chosen dynamically to perform the control function. Private enhanced wireless terminals 202 are programmed with encryption keys by the administrator of the private network in the same manner as the private wireless terminals 102.

In order to illustrate one method of association consider initially a wireless network that is entirely public or entirely private, so no encryption is required. This method is disclosed in more detail in our co-pending, unpublished British Patent Application 9716626.8 (PHB 34177), a summary of which method will be given in order to facilitate the understanding of the present invention.

Figure 3:
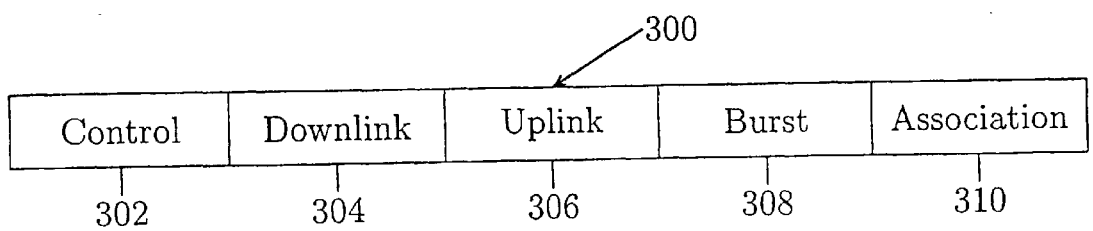
FIG. 3 is a diagram of an example of a transmission frame format suitable for use in a wireless network configured with a base station of the type shown in FIG. 1 when no encryption is used.

The format of the transmission frame 300 shown in FIG. 3 is for a base station orientated configuration of the type shown in FIG. 1. This particular format is intended for use with WATM and similar standards aimed at wireless local area networks. The format is a time division format comprising successive transmission frames 300, where each transmission frame 300 is divided into a number of sections, each of which contains a number of slots in which data is transmitted. The lengths of the complete frames and of the sections within them can be varied in response to changing requirements for data transmission to and from the wireless terminals 102, 103.

A control section 302 is used by the base station 108 to signal the allocation of slots to wireless terminals 102 in the sections comprising the remainder of the frame 300. The allocation takes into consideration the number of slots requested by the wireless terminals 102, 103, the available bandwidth, restrictions on the length of transmission frames and any other relevant criteria.

A downlink section 304 is used for transfer of data from the base station 108 to wireless terminals 102, 103, the transfer of data to a particular wireless terminal 102, 103 taking place in the slots allocated for it during the control section 302. An uplink section 306 is used for transfer of data in the reverse direction, from wireless terminals 102, 103 to the base station 108. Again, the transfer of data from a particular wireless terminal 102, 103 takes place in the slots allocated for it during the control section 302.

An energy burst section 308 may be provided for use by wireless terminals 102, 103 that have associated with the network but are inactive. Each of these terminals is assigned a unique slot within the energy burst section 308 in which it may transmit to indicate that it requires an uplink slot to transmit data. The base station 108 will then take this request into account when scheduling the slots in the uplink section 306 of the next transmission frame 300.

An association section 310 is provided for use by wireless terminals 102, 103 that wish to join the network. The base station 108 may modify the scheduling of the association section 310 to:

Schedule an association section 310 when it is convenient. This minimises the risk of losing transmission packets due to peaks in transmission traffic. Under conditions of high network traffic the base station 108 may not schedule an association section 310 in a transmission frame. In order to avoid completely shutting out new wireless terminals 102, 103 the base station 108 may be controlled so that there is a maximum time delay between one association section and the next.

Schedule association sections 310 more frequently during conditions of low network traffic. This allows faster association for waiting wireless terminals 102, 103.

Schedule multiple association sections 310. This may be desirable when many wireless terminals 102, 103 wish to associate, for example if no association sections 310 have been scheduled for some time.

Schedule no association sections 310, which may be desirable in some special circumstances. One example when the network has no spare capacity, another example is when a high security application is running and wishes to prevent any further wireless terminals 102, 103 joining the network.

It should be noted that the order of sections within the transmission frame illustrated in FIG. 3 may be varied, in particular it may be beneficial to schedule the energy burst section 308 and the association section 310 near the start of the frame to reduce transmission time delays.

Figure 4:
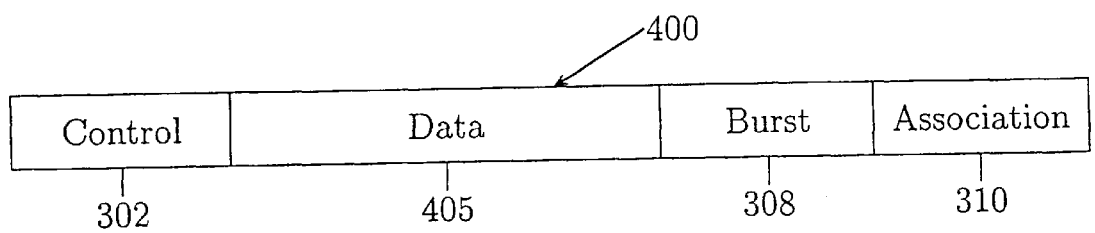
FIG. 4 is a diagram of an example of a possible transmission frame format suitable for use in a peer to peer configured wireless network of the type shown in FIG. 2 when no encryption is used.

The format of the transmission frame 400 shown in FIG. 4 is for a peer to peer configuration of the type shown in FIG. 2, although much of the format is the same as for the base station orientated frame format shown in FIG. 3. A control section 302 is used by the enhanced wireless terminal 202 acting as base station to allocate slots to wireless terminals 102, 103 in the remainder of the frame. There are no separate downlink and uplink sections. Instead there is a data transfer section 405, where transfer of data from one wireless terminal 102, 103 to another occurs in the slots allocated to it, the allocation of which was detailed during the control section 302.

The energy burst section 308 and association section 310 work in a similar manner to a base station orientated configuration.

In order to make a private network accessible to public users encryption is used by private wireless terminals 102. For such communication with private wireless terminals 102, the control section 302 needs to specify the choice of encryption key and a seed value. This may be done within the control section of a transmission frame, or it may be set at the association of each private wireless terminal 102 as part of the detailed association procedure.

Figure 5:
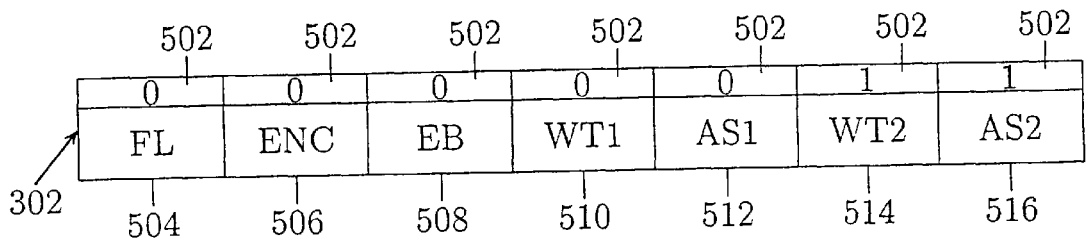
FIGS. 5 to 8 are diagrams of examples of the control section of the transmission frame format shown in FIG. 3 modified for use in a private wireless network with public access enabled.

One way in which association and scheduling may be handled is illustrated in FIG. 5, which shows in detail the control section 302 of a transmission frame. The control section 302 comprises a plurality of fields, each field having an encryption flag 502, which is set to 0 if the field is unencrypted and 1 if the field is encrypted. In this example the following fields are present:

1. FL, an unencrypted frame length field 504 which gives the length of this transmission frame;
2. ENC, an unencrypted encryption field 506 which provides the key and seed required for use with any later encrypted fields;
3. EB, an unencrypted energy burst field 508 which details the scheduling of slots in an energy burst section 308 (FIG. 3) for wireless terminals 102, 103 that have associated with the network but are inactive;
4. WT1, an unencrypted data field 510 which allocates slots in the uplink section 306 (FIG. 3) of the transmission frame for (unencrypted) use by a public wireless terminal 103;
5. AS1, an unencrypted association field 512 which schedules an association section 310 (FIG. 3) for use by public wireless terminals 103;
6. WT2, an encrypted data field 514 which allocates slots in the uplink section 306 (FIG. 3) of the transmission frame for (encrypted) use by a private wireless terminal 102; and
7. AS2, an encrypted association field 516 which schedules an association section 310 (FIG. 3) for use by private wireless terminals 102.

In practice there could be considerably more fields than in this example, for example with slots in an uplink section 306 allocated for several private and public wireless terminals 102, 103. As described above, association sections 310 for private and public wireless terminals 102, 103 will not necessarily be scheduled in every transmission frame, and do not have to be scheduled with equal frequency. Private wireless terminals 102 that have been allocated slots by an encrypted data field transmit using encryption and set the encryption flag 502 to 1 in these slots.

This first example showed association of private and public wireless terminals 102, 103 being handled by scheduling separate association sections 310 for each. An alternative is to schedule just an unencrypted association section 310 and then for the controller to schedule slots in both encrypted and unencrypted uplink sections 306 for the wireless terminal 102, 103 to provide further information to enable the base station 108 to determine whether it should be allowed to associate with the network. A private wireless terminal 102 will use the slots allocated in the encrypted uplink section 306, while a public wireless terminal 103 will use the slots allocated in the unencrypted uplink section 306.

Figure 6:
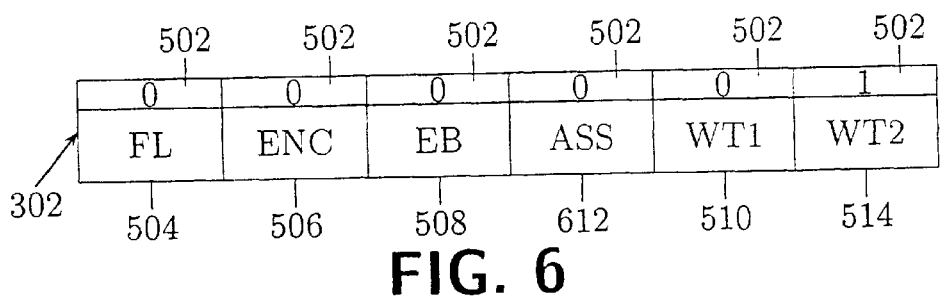

FIG. 6 shows a control section 302 of a transmission frame appropriate for this second method of association. The difference between this control section and that shown in FIG. 5 is that the unencrypted and encrypted association fields 512, 516 are replaced by ASS, an unencrypted association field 612, which schedules an association section for use by private and public wireless terminals 102, 103.

This second method has the advantage of reducing the number of association sections scheduled, while the first method has the advantage of enabling better control over association of private and public wireless terminals 102, 103. The first method has the further advantage of avoiding the waste of one of the slots scheduled for exchange of association information in the uplink section 306, since a private wireless terminal 102 will not use slots scheduled in an unencrypted uplink section 306, while a public wireless terminal will not use slots scheduled in an encrypted uplink section 306.

A further alternative is to remove the encryption flags 502. The presence of encryption might then be indicated by the position of the encryption field 506 in the control section 302, so that fields transmitted before the encryption field 506 are unencrypted while fields transmitted after the encryption field 506 are encrypted.

Figure 7:
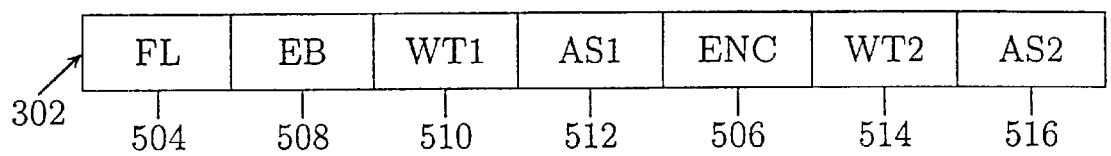
Figure 8:
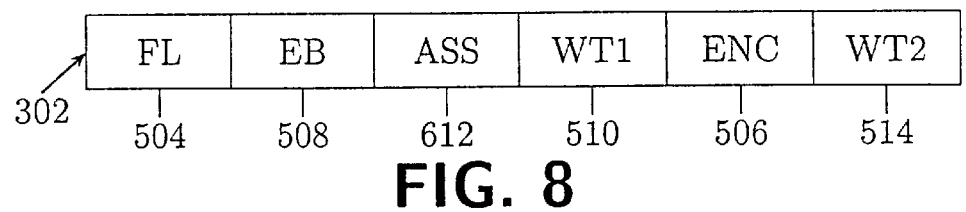

FIG. 7 shows an example of a control section 302 with the same fields as in FIG. 5 but without encryption flags 502. The encryption field 506 has been moved to just before the encrypted data field 514 and association field 516 to indicate that they are encrypted. The portion of the control section 302 preceding the encryption field 506 is unencrypted. A variation on this arrangement is shown in FIG. 8 where, as in FIG. 6, an unencrypted association field 612 schedules an association section for use by private and public wireless terminals 102, 103.

It will be apparent that other approaches are possible to signal the presence of encrypted and unencrypted fields within a transmission frame and to enable association by private and public wireless terminals.

The approaches described above are equally applicable to a peer to peer network using the transmission frame format shown in FIG. 4. The main difference is that the control function for the network is performed by a dynamically chosen enhanced wireless terminal 202.

From reading the present disclosure, other modifications will be apparent to persons skilled in the art. Such modifications may involve other features which are already known in the design, manufacture and use of wireless networks and component parts thereof which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of features during the prosecution of the present application or of any further application derived therefrom.

What is claimed is:

1. A method of operating a wireless network, wherein transmission of data takes place in transmission frames subdivided into time slots, the wireless network comprising a controller and a variable number of public and private wireless terminals, the method comprising the controller maintaining a list of wireless terminals currently registered with the network, determining the lengths of successive transmission frames and allocating time slots within said frames for various purposes, each frame including a control section which details the allocation of time slots in the remainder of the transmission frame, characterised by a part of the control section being unencrypted, to allocate time slots in an unencrypted part of the transmission frame for unencrypted data exchange, and another part of the control section being encrypted, to allocate time slots in an encrypted part of the transmission frame for encrypted data exchange.

2. A method as claimed in claim 1, characterised in that the control section comprises a first part which is unencrypted, a second part which is encryption control data and a third part which is encrypted.

3. A method as claimed in claim 1, characterised in that the transmission frame includes an association section for public wireless terminals which is scheduled in the unencrypted part of the control section and an association section for private wireless terminals which is scheduled in the encrypted part of the control section.

4. A controller for a wireless network having a plurality of public and private wireless terminals, the controller comprising means for maintaining a list of wireless terminals currently registered with the network, means for encryption, means for determining the lengths of successive transmission frames and means for allocating time slots within each of said frames for various purposes, each frame including a control section which details the allocation of time slots in the remainder of the transmission frame, characterised by means for generating a part of the control section in an unencrypted form, for allocating time slots in an unencrypted part of the transmission frame for unencrypted data exchange, and another part of the control section in encrypted form, for allocating time slots in an encrypted part of the transmission frame for encrypted data exchange.

5. A base station comprising a controller as claimed in claim 4, further comprising at least one transceiver for communicating with wireless terminals in a wireless network.

6. A base station as claimed in claim 5, further comprising means for connecting the controller to a fixed telecommunications network and means for exchanging data with said network.

7. A wireless terminal for use in a wireless network constituted by at least one wireless terminal and a controller which in operation generates transmission frames, each transmission frame including a control section, the wireless terminal comprising transceiver means and means for storing encryption data, characterised by means for obtaining encryption control data from the control section of a received transmission frame, means for determining which fields within a transmission frame are encrypted, means for decrypting received data transmitted in an encrypted part of a transmission frame and means for encrypting data to be transmitted in an encrypted part of a transmission frame.

8. A wireless terminal as claimed in claim 7, characterised in that the stored encryption data comprises a plurality of encryption keys each having a unique reference.

9. A wireless terminal as claimed in claim 7, characterised in that the encryption control data provides the reference for the encryption key to be used and a seed value for use by the encryption algorithm.

10. A wireless terminal as claimed in any one of claim 7, further comprising a controller comprising means for maintaining a list of wireless terminals currently registered with the network, means for encryption, means for determining the lengths of successive transmission frames, means for allocating time slots within each transmission frame for various purposes, each frame including a control section which details the allocation of time slots in the remainder of the transmission frame, means for generating part of the control section in an unencrypted form, for allocating time slots in an unencrypted part of the transmission frame for unencrypted data exchange, and the remainder of the control section in encrypted form, for allocating time slots in an encrypted part of the transmission frame for encrypted data exchange, said controller enabling the wireless terminal to function as a base station in a peer to peer network.

* * * * *